US012567539B2

(12) United States Patent
Guo et al.

(10) Patent No.: US 12,567,539 B2
(45) Date of Patent: Mar. 3, 2026

(54) METHODS FOR FORMING A HIGH CURRENT INDUCTOR AND NON-TRANSITORY COMPUTER READABLE MEDIUM

(71) Applicant: Applied Materials, Inc., Santa Clara, CA (US)

(72) Inventors: Yue Guo, San Mateo, CA (US); Steven Derek Lane, Porterville, CA (US); Kartik Ramaswamy, San Jose, CA (US); Yang Yang, Cupertino, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 1142 days.

(21) Appl. No.: 17/314,570

(22) Filed: May 7, 2021

(65) Prior Publication Data

US 2022/0359118 A1 Nov. 10, 2022

(51) Int. Cl.
*H01F 7/06* (2006.01)
*H01F 27/29* (2006.01)
*H01F 41/04* (2006.01)

(52) U.S. Cl.
CPC ............. *H01F 41/04* (2013.01); *H01F 27/29* (2013.01)

(58) Field of Classification Search
CPC ......... H01F 27/29; H01F 37/005; H01F 41/04
See application file for complete search history.

(56) References Cited

U.S. PATENT DOCUMENTS 7,391,292 B2 6/2008 Maeda et al.
7,956,713 B2 6/2011 Chandrasekhar et al.
8,665,048 B2 * 3/2014 Crocker ................ H01F 41/061 336/208
8,941,212 B2 1/2015 Yen et al.
9,300,046 B2 3/2016 Singh et al.
9,468,750 B2 10/2016 Kondabatni et al.
10,699,836 B2 * 6/2020 Schekulin ............... H01F 41/00
2002/0173429 A1 11/2002 Ehrenberg et al.
2003/0013264 A1 * 1/2003 Yeo ....................... H01L 23/645 438/381

(Continued)

FOREIGN PATENT DOCUMENTS

CN 101673610 A 3/2010
CN 111029106 A 4/2020
JP 02256214 A * 10/1990

OTHER PUBLICATIONS

PCT International Search Report and Written Opinion for PCT/US2022/027365 dated Aug. 26, 2022.

*Primary Examiner* — Paul D Kim
(74) *Attorney, Agent, or Firm* — Moser Taboada

(57) ABSTRACT

Methods for forming a high current inductor leverage solid core materials to form ribbon inductors. In some embodiments, the method may include forming a central opening lengthwise through a solid core conductive material, wherein the solid core conductive material has an outer diameter, the central opening forms an inner diameter of the solid core conductive material, and a difference between the outer diameter and the inner diameter is a thickness of a ribbon conductor of the high current inductor and removing a spiral portion of the solid core conductive material to form the ribbon conductor of the high current inductor, wherein a width of the spiral portion forms a gap spacing between windings of the ribbon conductor.

14 Claims, 5 Drawing Sheets

(56) References Cited

U.S. PATENT DOCUMENTS

| | | | |
|---|---|---|---|
| 2008/0130184 | A1 | 6/2008 | Hartman et al. |
| 2009/0022905 | A1 | 1/2009 | Kudela et al. |
| 2009/0079530 | A1 | 3/2009 | Chandrasekhar et al. |

* cited by examiner

METHODS FOR FORMING A HIGH CURRENT INDUCTOR AND NON-TRANSITORY COMPUTER READABLE MEDIUM

FIELD

Embodiments of the present principles generally relate to semiconductor manufacturing.

BACKGROUND

Inductors are used along with other electronic elements such as capacitors to help tune loads for high power frequency generators used to provide power for processing chambers in the production of semiconductors. Matching networks allow for maximum power transfer between the generators and the processing chambers by maintaining an optimum load as seen by the generators. By automatically adjusting matching impedances between the generators and the processing chambers, a matching network ensures maximum power transfer for different frequencies and different chamber loads. The inventors have observed that during operation the inductor in the match network becomes very hot when subjected to high current loads causing heat/melting damage to surrounding materials.

Accordingly, the inventors have provided methods and apparatus for forming an inductor with superior current handling capabilities.

SUMMARY

Methods and apparatus for forming a high current inductor are provided herein.

In some embodiments, a method for forming a high current inductor may comprise forming a central opening lengthwise through a solid core conductive material, wherein the solid core conductive material has an outer diameter, the central opening forms an inner diameter of the solid core conductive material, and a difference between the outer diameter and the inner diameter is a thickness of a ribbon conductor of the high current inductor and removing a spiral portion of the solid core conductive material to form the ribbon conductor of the high current inductor, wherein a width of the spiral portion forms a gap spacing between windings of the ribbon conductor.

In some embodiments, the method may further include wherein the thickness of the ribbon conductor of the high current inductor is approximately 0.060 inches to approximately 0.250 inches, wherein the gap spacing is approximately 0.250 inches to approximately 1.0 inches, wherein the high current inductor has an inductance of approximately 50 nH to approximately 1000 nH, wherein the high current inductor has a length of approximately 2 inches to approximately 20 inches, wherein the inner diameter is approximately 0.5 inches to approximately 5.0 inches, wherein the outer diameter is approximately 0.55 inches to approximately 5.25 inches, wherein the solid core conductive material is copper, wherein the copper is silver plated, positioning an insert inside the high current inductor, wherein the insert has a second outer diameter approximately equal to the inner diameter, wherein the insert is hollow and is formed of a material with a high thermal conductivity and a low dielectric constant, the insert is configured to extract heat from the high current inductor to an inner surface of the insert that is configured to allow coolant to flow across the inner surfaces, wherein the high current inductor operates from greater than zero kilowatts to approximately 10 kilowatts of power, wherein the high current inductor operates at a frequency of 1 MHz to approximately 300 MHz, and/or wherein the high current inductor has an inductive tolerance of less than 5%.

In some embodiments, a non-transitory, computer readable medium having instructions stored thereon that, when executed, cause a method for forming a high current inductor to be performed, the method may comprise forming a central opening lengthwise through a solid core conductive material, wherein the solid core conductive material has an outer diameter, the central opening forms an inner diameter of the solid core conductive material, and a difference between the outer diameter and the inner diameter is a thickness of a ribbon conductor of the high current inductor and removing a spiral portion of the solid core conductive material to form the ribbon conductor of the high current inductor, wherein a width of the spiral portion forms a gap spacing between windings of the ribbon conductor. In some embodiments, the non-transitory, computer readable medium may further include wherein the high current inductor has an inductance of approximately 50 nH to approximately 1000 nH with an inductive tolerance of less than approximately 5%.

In some embodiments, an apparatus for providing inductance may comprise a high current inductor having a monolithic ribbon conductor formed from a solid core conductive material by removing a center portion and a spiral portion, wherein the monolithic ribbon conductor has a helix shape and one or more electrical connection points on a first end of the monolithic ribbon conductor and on a second end of the monolithic ribbon conductor, wherein the high current inductor is configured to operate with up to 200 amps of current or more and has an inductive tolerance of less than approximately 5%. In some embodiments, the apparatus may further include wherein the solid core conductive material is copper, wherein the high current inductor is configured to operate from zero kilowatts to approximately 10 kilowatts of power or more, and/or wherein an inductive value of the high current inductor is in a range of approximately 50 nH to approximately 1000 nH.

Other and further embodiments are disclosed below.

BRIEF DESCRIPTION OF THE DRAWINGS

Embodiments of the present principles, briefly summarized above and discussed in greater detail below, can be understood by reference to the illustrative embodiments of the principles depicted in the appended drawings. However, the appended drawings illustrate only typical embodiments of the principles and are thus not to be considered limiting of scope, for the principles may admit to other equally effective embodiments.

Figure 1:
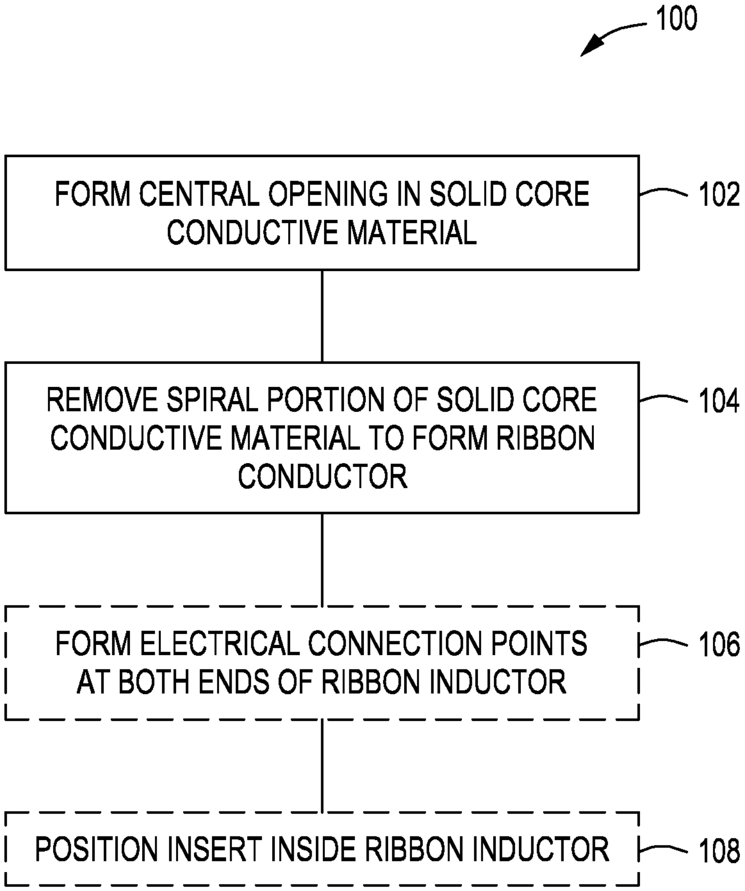
FIG. 1 is a method of forming a high current inductor in accordance with some embodiments of the present principles.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

The methods and apparatus enable formation of ribbon inductors for high power and high current applications that can be produced with small inductance variations. The inductor is a critical circuit component in high power RF impedance matching networks used in semiconductor processing chambers and other high-power applications. The techniques of the present principles produce a ribbon inductor that enables the design of high power 10 kW RF matching networks. Instead of fabricating an inductor using magnet wires on a lathe or coil winder, the ribbon inductor of the present principles can be machined from a solid cylinder of conductive material. The resulting ribbon inductor can handle very high power (approximately 10 kW or more) and high current (approximately 200 A or more) with small inductance variations from one inductor to another inductor which is critical in RF impedance matching network applications for filtering and impedance tuning purposes. The small inductance variation allows a manufacturer to produce products with tighter tolerances and reproducible performance from product to product. Another advantage of the present principles is an inductor with an operating temperature that is up to 50% or more lower than traditionally wound inductors.

Traditional inductors are fabricated by using magnet wires or tubes and rolled on a lathe or coil winder. A traditional inductor cannot be used for high current and high-power applications because the size of the wire or tube used in the windings has a small cross-sectional area which increases the wires or tubes resistivity to high levels of current. When high levels of current are applied to traditional inductors, the electrical resistance causes substantial heat within the winding which leads to failures such as insulation breakdown (wire-to-wire shorting) and heat damage to surrounding components. The inventors have found that with traditionally wound inductors, the turn-to-turn windings always have some variations which cause overall inductance value variations as the inductors are manufactured. The inventors have also found that the traditionally wound inductors were unable to conduct large currents due to the small surface areas of the wires or tubing used in the traditionally wound inductors. The inventors have discovered that the ribbon inductors of the present principles allow for a much higher power and higher current inductor to be produced within the same geometric volume as the lower power and lower current traditionally wound inductor while dramatically increasing the power handling and performance. The ribbon inductors of the present principles can also be produced with very low inductor-to-inductor inductance variations which enable tight tolerance products to be manufactured for repeatable performance across a line of products or within a productor (e.g., process chamber with multiple RF impedance match networks).

Figure 2:
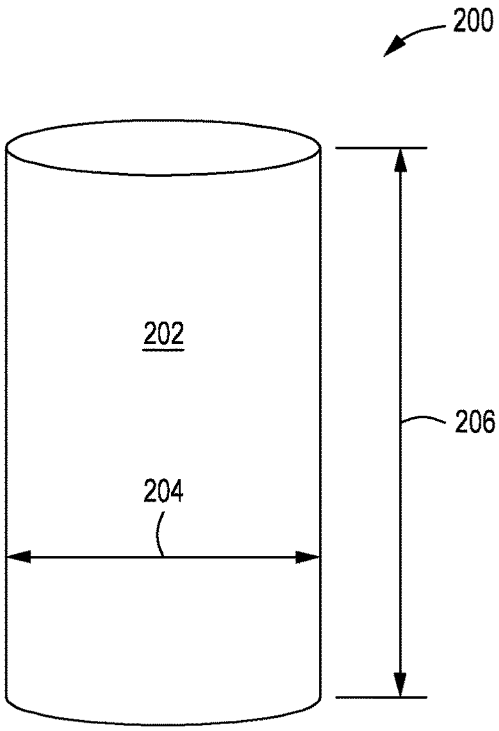
FIG. 2 depicts an isometric view of a solid core conductive material in accordance with some embodiments of the present principles.
Figure 3:
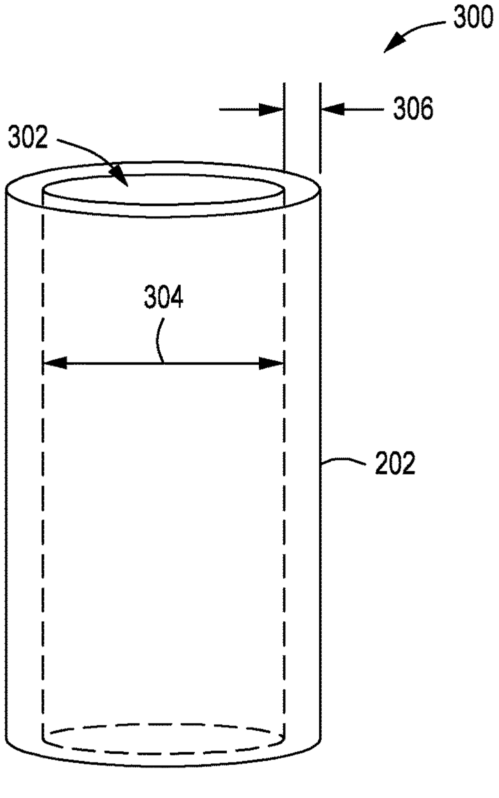
FIG. 3 depicts an isometric view of a central opening in a solid core conductive material in accordance with some embodiments of the present principles.
Figure 4:
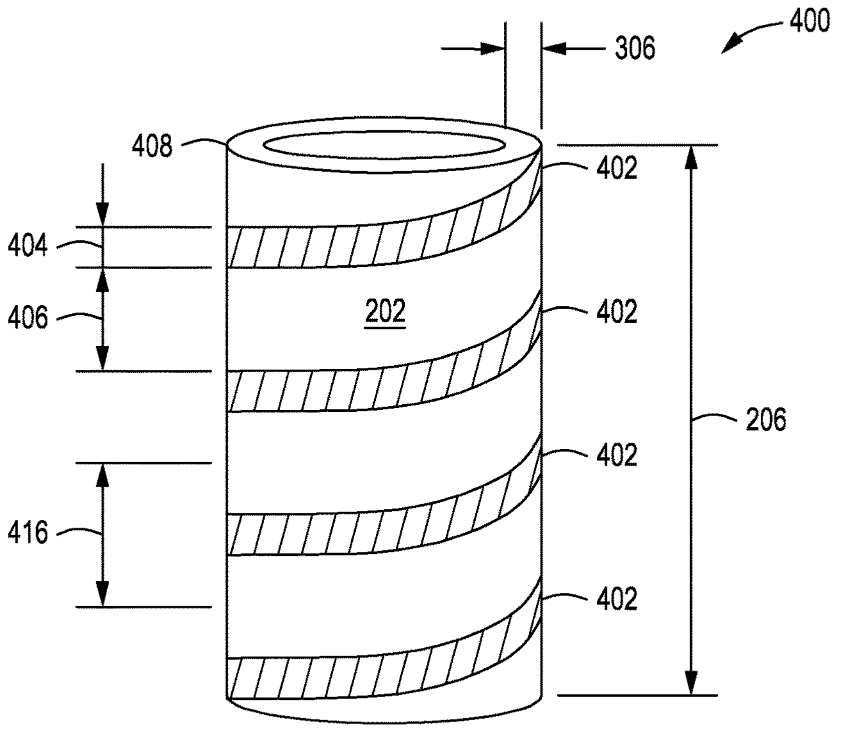
FIG. 4 depicts an isometric view of a spiral section for removal in accordance with some embodiments of the present principles.

FIG. 1 is a method 100 of forming a high-power inductor. References may be made to FIGS. 2-8 in describing the method 100. In block 102, a central opening 302 is formed in a solid core conductive material 202. The solid core conductive material 202, as depicted in a view 200 of FIG. 2, may comprise a copper material and the like with high conductivity (and low resistivity to reduce thermal issues). The solid core conductive material 202 may have a length 206 of approximately 2 inches to approximately 20 inches. The solid core conductive material 202 may have an outer diameter (OD) 204 of approximately 0.55 inches to approximately 5.25 inches. The central opening 302 as depicted in a view 300 of FIG. 3, has an inner diameter (ID) 304 of approximately 0.5 inches to approximately 5.0 inches. The wall or coil thickness 306 is approximately 0.060 inches to approximately 0.250 inches. The central opening may be formed by drilling or milling the solid core conductive material 202 throughout from end to end as depicted in FIG. 3.

Figure 5:
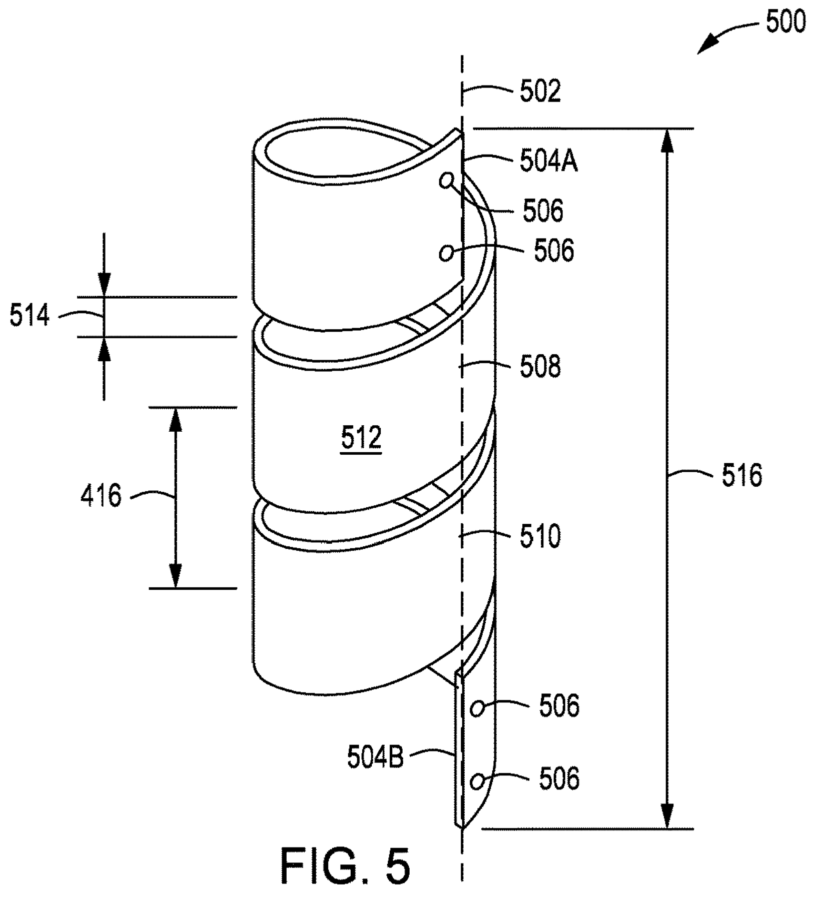
FIG. 5 depicts an isometric view of a high current conductor in accordance with some embodiments of the present principles.
Figure 6:
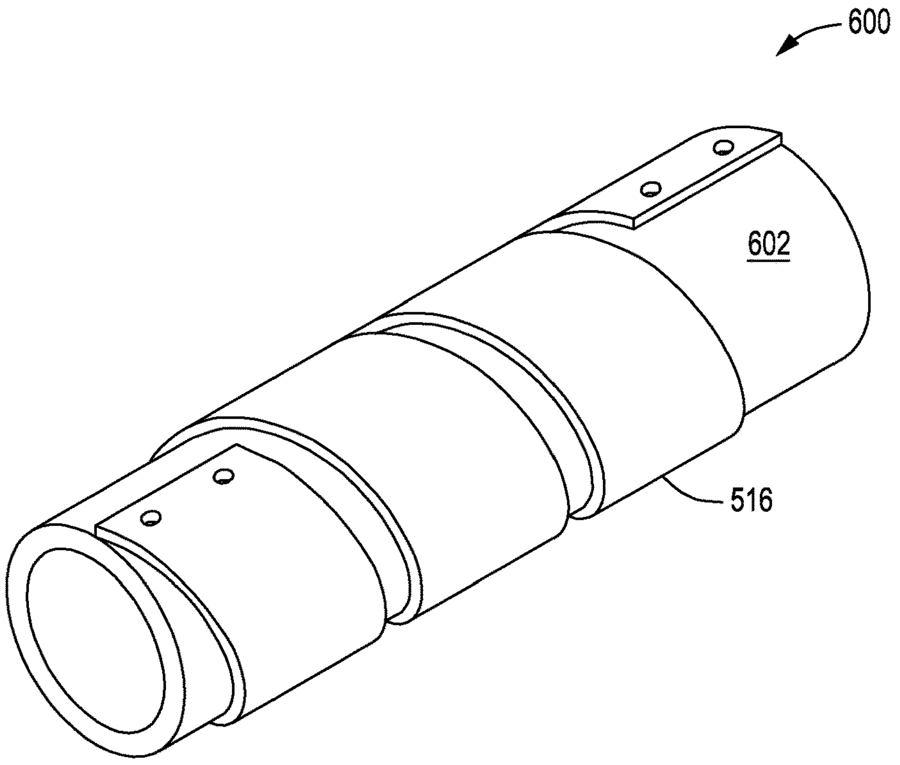
FIG. 6 depicts an isometric view of a high current conductor with an inner tube support in accordance with some embodiments of the present principles.

In block 104, a spiral portion 402 of the solid core conductive material 202 is removed to form a ribbon conductor 512 (see FIG. 5). The spiral portion 402 as depicted in a view 400 of FIG. 4 runs around the solid core conductive material 202 from a top 408 of the solid core conductive material 202 to a bottom 410 of the solid core conductive material 202 (over the length 206). The thickness of the spiral portion 402 is the same as the coil thickness 306. A spiral portion width 404 or "gap spacing" may be from approximately 0.250 inches to approximately 1.0 inches. The spiral portion width 404 becomes the gap spacing 514 between the ribbon conductor windings (see FIG. 5) after the spiral portion 402 is removed. The gap spacing 514 turn-to-turn determines at what frequency the self-capacitance of an inductor becomes like a transmission line (inductor stops behaving like an inductor and acts instead like a capacitor). In some embodiments, the gap spacing 514 is adjusted to increase the resonance cutoff frequency much higher than an operating frequency to control the self-capacitance point (the larger the gap spacing, the higher the resonance frequency becomes). For example, if a matching network frequency is 40 MHz, the resonance cutoff frequency may be designed, by adjusting the gap spacing 514, to be 80 MHz or more. In addition, the gap spacing 514 is generally much greater than in traditionally wound inductors which reduces parasitic capacitance.

The coil pitch 416 can be well controlled during manufacturing, which greatly reduces inductance variations. The coil pitch 416 is the distance between turns measured between ribbon conductor winding centers. The coil pitch 416 may be adjusted to yield more or less turns for an inductor for a given length. Higher operating frequencies require less turns in the inductor. In some embodiments, the resulting ribbon inductor may operate from 1 MHz to 300 MHz. In some embodiments, the resulting ribbon inductor may operate from 27 MHz to 200 MHz. The spiral portion 402 may be removed via a milling process or via an automated computer-controlled process such as a computer numerical control (CNC) process and the like. A ribbon conductor width 406 may be from approximately 0.5 inches to approximately 4.0 inches and adjusted based on a desired current value running through the ribbon conductor (wider ribbon width allows higher current flow).

Embodiments in accordance with the present principles may be implemented in hardware, firmware, software, or any combination thereof. Embodiments may also be implemented as instructions stored using one or more computer readable media, which may be read and executed by one or more processors. A computer readable medium may include any mechanism for storing or transmitting information in a form readable by a machine (e.g., a computing platform or a "virtual machine" running on one or more computing platforms). For example, a computer readable medium may include any suitable form of volatile or non-volatile memory. In some embodiments, the computer readable media may include a non-transitory computer readable medium.

The large surface area of the ribbon conductor 512 allows very high current (e.g., 200A or more) to flow through the ribbon conductor 512 and also affords better heat dissipation. After removal of the spiral portion 402, the ribbon conductor 512 is formed which also forms the basis of a ribbon inductor 516. The ribbon conductor 512 is formed from the solid core conductive material 202 in the shape of a helix. The ribbon conductor 512 is a "monolithic ribbon conductor" in that the ribbon conductor 512 is rigid and is formed from a single piece of material. In the view 500 of FIG. 5, the ribbon inductor 516 has undergone some additional processing to square up a first end 504A and a second end 504B. A line 502 indicates a winding start/end point. In an example of FIG. 5, the ribbon inductor 516 has been formed with three windings. A first winding starts at the first end 504A and ends at a first winding end 508. The second winding starts at the first winding end 508 and ends at a second winding end 510. The third winding starts at the second winding end 510 and ends at the second end 504B. In some embodiments, inductance values of approximately 50 nH to approximately 1000 nH may be obtained based on parameters such as, for example but not limited to, the number of windings (e.g., coil pitch), length, gap spacing, thickness, and diameter of the ribbon inductor 516. In some embodiments, the ribbon inductor 516 may be silver plated. The silver plating prevents copper material from oxidizing. Copper oxide is less conductive than copper, reducing the electrical conductivity of the copper. Silver produces silver oxide which is highly conductive and increases the electrical conductivity of a silver-plated copper ribbon inductor.

The machining processes used in the present principles to form a ribbon inductor allow for high precision which translates to reproducible inductance values over an inductor production run which is not obtainable with traditionally wound inductors. By using a solid core material to form a ribbon inductor, the ribbon inductor is more structurally rigid which translates to less inductance value changes over a given current range and/or temperature range than with traditionally wound inductors. Manufacturing tolerances of less 5% for inductance values may be obtained using the formation methods of the present principles. The inventors have also found that machining an inductor from a solid core material eliminates internal stresses due to the winding of wires or tubes as found in traditionally wound inductors, reducing failures caused by fatigue or increased resistivity produced by the added internal stresses.

In optional block 106, one or more electrical connection points at one or more ends of the ribbon inductor 516 may be formed. In some embodiments, one or more fastening points 506 may be formed in the first end 504A and/or the second end 504B. The one or more fastening points 506 may be holes or other implementations that allow electrical connections (electrical connection points) to be made to the ends of the ribbon inductor 516 in order to flow current through the ribbon inductor 516. In optional block 108, an insert 602, such as a tube-like structure, may be positioned inside the ribbon inductor 516 as depicted in a view 600 of FIG. 6. In some embodiments, the insert 602 may function as a structural support to facilitate in maintaining the shape of the ribbon inductor 516 with air cooling. In some embodiments, the insert 602 may alternatively, or in conjunction with providing support, function to provide a cooling path to aid in cooling the ribbon inductor 516 during operation to further increase the current capacity of the ribbon inductor 516.

Figure 7:
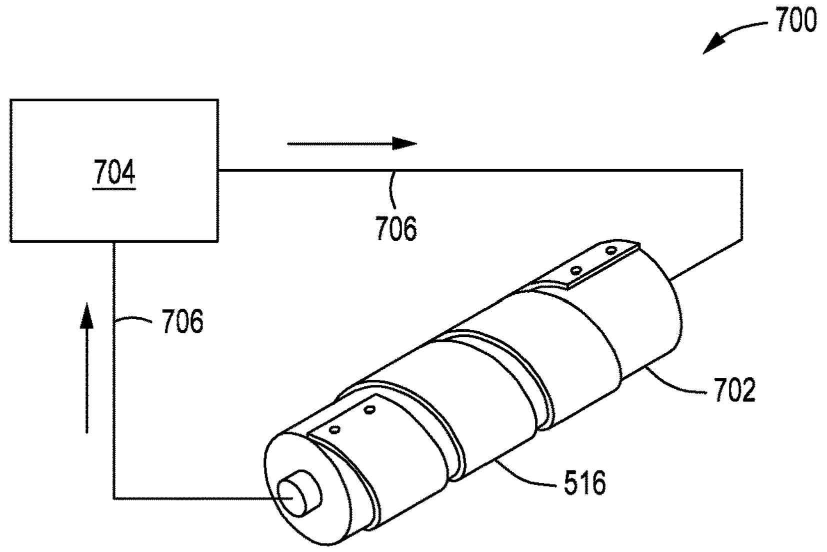
FIG. 7 depicts an isometric view of a high current conductor with a cooling tube in accordance with some embodiments of the present principles.
Figure 8:
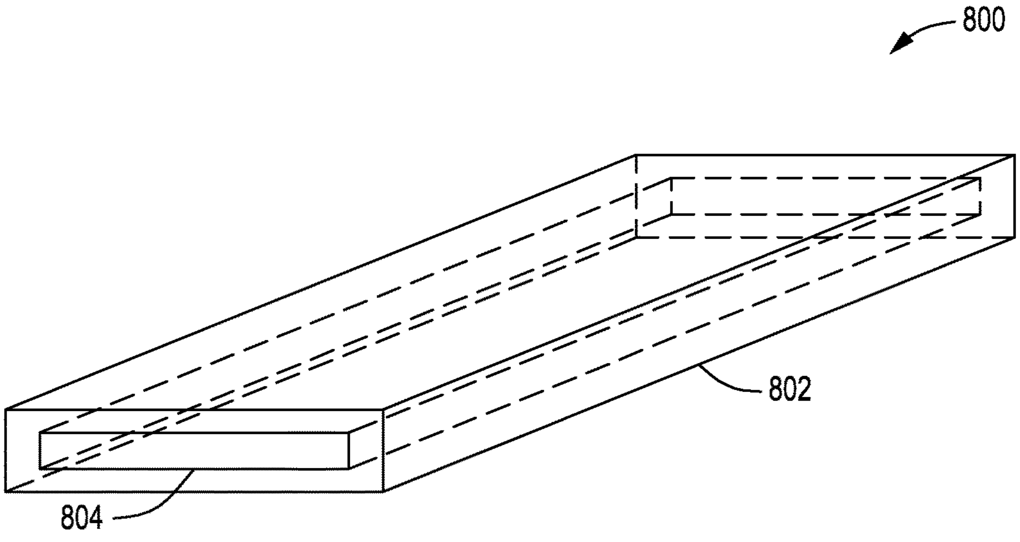
FIG. 8 depicts an isometric view of rectangular tubing in accordance with some embodiments of the present principles.

For example, as depicted in a view 700 of FIG. 7, a cooling tube 702 is inserted into the ribbon inductor 516. Cooling lines 706 are connected between a heat exchanger system 704 to allow cooling fluid to flow through the cooling tube 702 to reduce the temperature of the ribbon inductor 516 during operation. In some embodiments, the cooling tube 702 is a high thermal conductivity insulator with a low dielectric constant (electrical insulator). In some embodiments, cooling fluid may also be flowed through the inside of the ribbon inductor as depicted in a view 800 of FIG. 8. In some embodiments, rectangular tubing 802 with an inner opening 804 may be used to form a ribbon inductor. The ribbon inductor may then be formed by winding the rectangular tubing 802 around a cylindrical form to create the windings of the ribbon inductor. In some embodiments, the rectangular tubing 802 may be formed into a ribbon inductor as depicted in FIG. 5 with gap spacing and winding count varied to form a particular inductance value with particular operational frequencies as described above. The cross-sectional area of the rectangular tubing 802 minus the inner opening 804 determines an effective cross-sectional area of the ribbon inductor which may also be adjusted to increase current carrying capabilities. Because the ribbon inductor is hollow in the inside, coolant can be flowed through the inside of the ribbon inductor to control the temperature of the ribbon inductor. A ribbon inductor formed from the rectangular tubing 802 may be used in a cooling system as described for FIG. 7 with the coolant running internal to the rectangular tubing 802 through the inner opening 804. In some embodiments, additional cooling may be provided by using the insert 602 and flowing additional coolant through the insert 602 as well as through the rectangular tubing 802. Cooling of the inductor controls the amount of expansion and contraction of the inductor which can cause variances in performance such as, but not limited to, variances in inductive value and current carrying capabilities.

Figure 9:
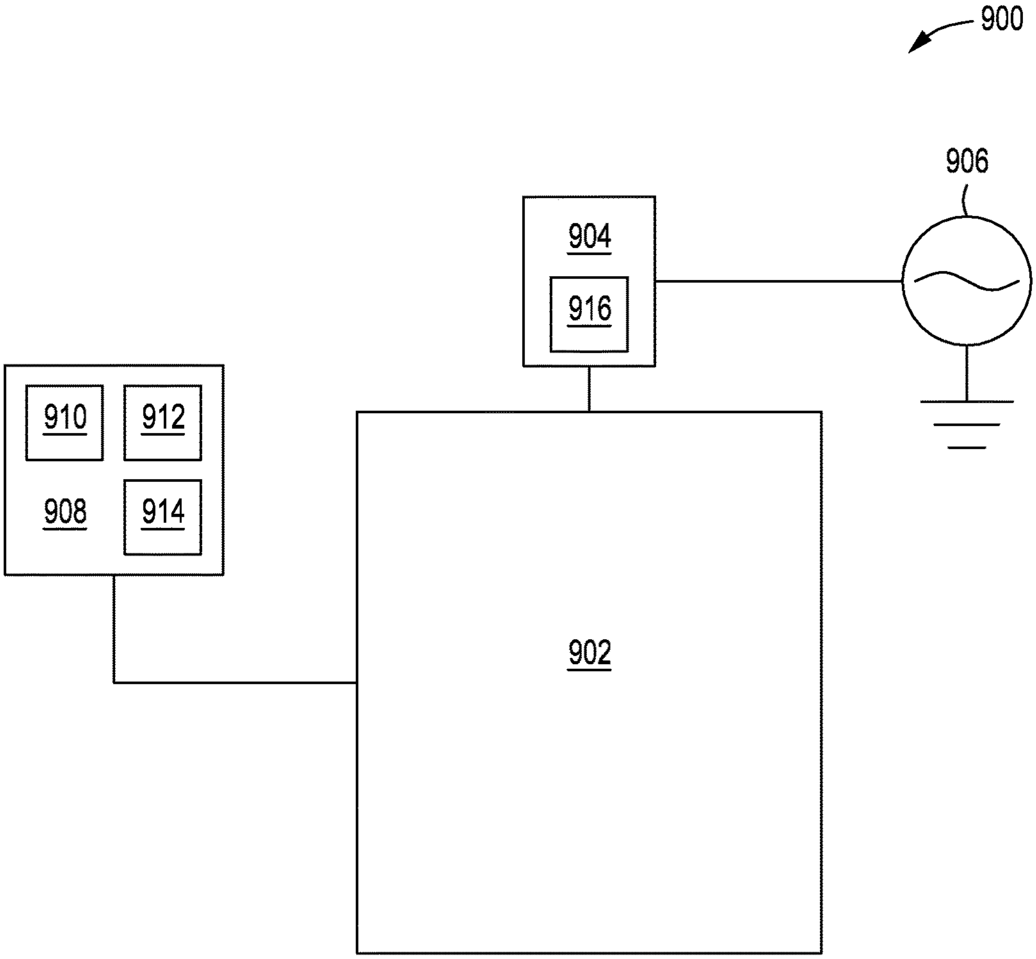
FIG. 9 depicts a cross-sectional view of a semiconductor processing chamber in accordance with some embodiments of the present principles.

In some embodiments, a ribbon inductor 916 may be used in a semiconductor processing system 900 of FIG. 9 as part of an RF impedance matching network 904. The RF impedance matching network 904 is electrically connected between an RF power source 906 and a processing chamber 902 to automatically match impedances between the RF power source 906 and the processing chamber 902. In some embodiments, the RF power source 906 may operate at a frequency range of approximately 10 MHz to approximately 200 MHz. By matching impedances, the RF impedance matching network 904 ensures that the power transfer from the RF power source 906 and the processing chamber 902 is maximized for optimal operating efficiency. In some embodiments, the ribbon inductor 916 may be used in the RF impedance matching network 904 to optimize power efficiency of a plasma chamber. The ribbon inductor 916 is critical for filtering and impedance turning purposes. A ribbon inductor of the present principles with small inductance variation is suitable for use in high power (10 kW or more) RF matching networks. Because the ribbon inductor of the present principles is more stable and precise than traditionally wound inductors, when used in RF impedance matching networks, the performance of the RF impedance matching network is increased due to the low variations of the inductance value over the operating range of the RF impedance matching network. Because the inductance value is stable, the RF impedance matching network does not have to constantly compensate for inductance value changes with changes in temperature, frequency, and/or voltage and current, reducing oscillations when impedance matching. In addition, the ribbon inductor of the present principles advantageously reduces power loss. The large surface area which affords better cooling also assists in reducing RF power loss due to skin effect. Another benefit is the reduction of variation between inductance values from ribbon inductor to ribbon inductor. The low inductance variation allows the ribbon inductor to improve system consistency in large volume production.

In some embodiments, a controller 908 may be used in the semiconductor processing system 900. The controller 908 controls the operation of the semiconductor processing system 900 using direct control or alternatively, by controlling the computers (or controllers) associated with the apparatus of the semiconductor processing system 900. In operation, the controller 908 enables data collection and feedback from the respective apparatus and systems to optimize performance of the semiconductor processing system 900. The controller 908 permits monitoring of, for example, the impedance matching processes to collect data. With the ribbon inductor of the present principles, the controller 908 will see less parameter variations and impedance matching process drifts. The controller 908 generally includes a Central Processing Unit (CPU) 910, a memory 912, and a support circuit 914. The CPU 910 may be any form of a general-purpose computer processor that can be used in an industrial setting. The support circuit 914 is conventionally coupled to the CPU 910 and may comprise a cache, clock circuits, input/output subsystems, power supplies, and the like. Software routines, such as a method as described below may be stored in the memory 912 and, when executed by the CPU 910, transform the CPU 910 into a specific purpose computer (controller 908). The software routines may also be stored and/or executed by a second controller (not shown) that is located remotely from the semiconductor processing system 900.

The memory 912 is in the form of computer-readable storage media that contains instructions, when executed by the CPU 910, to facilitate the operation of the semiconductor processes and equipment. The instructions in the memory 912 are in the form of a program product such as a program that implements process recipes, power transfer optimization, impedance matching control, etc. The program code may conform to any one of a number of different programming languages. In one example, the disclosure may be implemented as a program product stored on a computer-readable storage media for use with a computer system. The program(s) of the program product define functions of the aspects (including the methods described herein). Illustrative computer-readable storage media include, but are not limited to: non-writable storage media (e.g., read-only memory devices within a computer such as CD-ROM disks readable by a CD-ROM drive, flash memory, ROM chips, or any type of solid-state non-volatile semiconductor memory) on which information is permanently stored; and writable storage media (e.g., floppy disks within a diskette drive or hard-disk drive or any type of solid-state random access semiconductor memory) on which alterable information is stored. Such computer-readable storage media, when carrying computer-readable instructions that direct the functions of the methods described herein, are aspects of the present principles.

While the foregoing is directed to embodiments of the present principles, other and further embodiments of the principles may be devised without departing from the basic scope thereof.

The invention claimed is:

1. A method for forming a high current inductor, comprising:

forming a central opening lengthwise through a conductive material with a solid core, wherein the conductive material has an outer diameter, the central opening forms an inner diameter of the conductive material, and a difference between the outer diameter and the inner diameter is a thickness of a ribbon conductor of the high current inductor; and removing a spiral portion of the conductive material to form a continuous spiral gap for an entire length of the conductive material, wherein a remaining portion of the conductive material forms the ribbon conductor in a shape of a helix of the high current inductor, wherein a width of the spiral portion forms a gap spacing between windings of the ribbon conductor, and wherein the high current inductor is configured to conduct at least 200 amps of current.

2. The method of claim 1, wherein the thickness of the ribbon conductor of the high current inductor is approximately 0.060 inches to approximately 0.250 inches.

3. The method of claim 1, wherein the gap spacing is approximately 0.250 inches to approximately 1.0 inches.

4. The method of claim 1, wherein the high current inductor has an inductance of approximately 50 nH to approximately 1000 nH.

5. The method of claim 1, wherein the high current inductor has a length of approximately 2 inches to approximately 20 inches.

6. The method of claim 1, wherein the inner diameter is approximately 0.5 inches to approximately 5.0 inches.

7. The method of claim 1, wherein the outer diameter is approximately 0.55 inches to approximately 5.25 inches.

8. The method of claim 1, wherein the conductive material is copper.

9. The method of claim 8, wherein the copper is silver plated.

10. The method of claim 1, further comprising:

positioning an insert inside the high current inductor, wherein the insert has a second outer diameter approximately equal to the inner diameter.

11. The method of claim 10, wherein the insert is hollow and is formed of a material with a high thermal conductivity and a low dielectric constant, the insert is configured to extract heat from the high current inductor to an inner surface of the insert that is configured to allow coolant to flow across the inner surfaces.

12. The method of claim 1, wherein the high current inductor is configured to operate from greater than zero kilowatts to approximately 10 kilowatts of power.

13. The method of claim 1, wherein the high current inductor is configured to operate at a frequency of 1 MHz to approximately 300 MHz.

14. The method of claim 1, wherein the high current inductor has an inductive tolerance of less than 5%.

* * * * *